United States Patent [19]
Sako et al.

[11] Patent Number: 4,788,685
[45] Date of Patent: Nov. 29, 1988

[54] APPARATUS FOR RECORDING AND REPRODUCING DATA

[75] Inventors: Yoichiro Sako, Tokyo; Tamotsu Yamagami, Kanagawa; Shinichi Yamamura, Tokyo, all of Japan

[73] Assignee: Sony Corporation, Tokyo, Japan

[21] Appl. No.: 14,398

[22] Filed: Feb. 13, 1987

[30] Foreign Application Priority Data

Feb. 19, 1986 [JP] Japan .................................. 61-34336

[51] Int. Cl.$^4$ ............................................. G06F 11/10
[52] U.S. Cl. ........................................ 371/38; 371/40; 371/41
[58] Field of Search ........................ 371/38, 39, 40, 37, 371/41; 360/18, 19.1, 53, 38.1

[56]  References Cited
U.S. PATENT DOCUMENTS

| | | |
|---|---|---|
| 4,604,657 | 8/1986 | Fukami et al. ........................ 360/32 |
| 4,680,764 | 7/1987 | Suzuki .................................... 371/40 |
| 4,698,810 | 10/1987 | Fukuda ................................. 371/38 |

FOREIGN PATENT DOCUMENTS 3544819 6/1986 Fed. Rep. of Germany .
2168512 6/1986 United Kingdom .
2173076 10/1986 United Kingdom .

Primary Examiner—Jerry Smith
Assistant Examiner—Robert W. Beausoliel
Attorney, Agent, or Firm—Philip M. Shaw, Jr.

[57] ABSTRACT

A recording and reproducing apparatus comprising a memory for storing input data to be recorded in units of a predetermined quantity, a first address control means for generating only sequential memory addresses, a second address control means for generating non-sequential memory addresses, and means for adding a redundant bit such as an error correcting code and so on to each predetermined quantity unit of data, wherein when the input data has no correlation with adjacent input data, the input data is sequentially written in the memory by the first address control means, read out therefrom, added with the redundant bit, and sequentially recorded on the recording medium without changing the order of the inputted data, while when the input data has a correlation with adjacent input data, the input data is written in the memory by the second address control means in scrambled form, read out therefrom, as scrambled, and then the scrambled data is added to the redundant bit and recorded on the recording medium. Essentially the reverse operation takes place upon reproduction of the recorded signals.

11 Claims, 5 Drawing Sheets

APPARATUS FOR RECORDING AND REPRODUCING DATA

BACKGROUND OF THE INVENTION

1. Field of the Invention

This invention relates generally to a recording and reproducing apparatus, and more particularly to an apparatus of the kind which records and reproduces a variety of data by the use of a recording medium having a large capacity such as a magneto-optical disk.

2. Description of the Prior Art

Conventionally, hard disk units are known which can write data on a large capacity disk unit for information storage.

This unit is generally used as data storage for a computer. The information is recorded in a concentric or spiral track formed on the disk and the disk is rotated at a predetermined rotational speed.

FIG. 1 is a block diagram schematically showing a prior art recording and reproducing apparatus. Writing data in and reproducing the same data from a hard disk unit 1 is effected by a CPU 3 through a data bus 2. The disk arranged in the hard disk unit is rotated at a constant rotational speed irrespective of (not synchronized with) the transmission rate of data inputted on the disk. Instead, the rotational speed is timed by the CPU 3 for recording data on the disk. The data processed by the hard disk unit may thus be non-sequential data.

Data communication between the hard disk unit 1 and the CPU 3 is effected via a RAM 4 which serves as a buffer memory. It is further possible to communicate the data between the RAM 4 and the hard disk unit 1 at a high speed by the use of a DMA controller, without interruption by the CPU 3, wherein data is processed non-sequentially.

Data representing a still image or the like can be processed as a one frame portion of intermittent data by using a frame memory for the RAM 4.

FIG. 2 is a block diagram showing a construction of a circuit for processing such burst data. Disk controller 5 is arranged between the CPU 3 and the disk unit 1. A required portion of burst data stored in RAM 4 is recorded in the disk unit 1 through the disk controller 5 under the control of the CPU 3. This construction is used, for example, in an electronic mail system.

The "new media era" provides us with a variety of information in many kinds of media, that is, multi-media information. Such information includes non-sequential or intermittent data which does not have any correlation with adjacent data, such as computer data; data which has a correlation with adjacent data, but is as a whole non-sequential, such as data representing a still image; data which has a correlation with adjacent data and is sequential, such as digital audio data; and so on. These data have different characteristics from each other.

It would be useful to be able to write all the types of data information on a disk and provide users with the disk. The magneto-optical disk is a rewritable large capacity storage medium and can store multi-media information. The magneto-optical disk is different from a hard disk unit which records and reproduces data under strictly controlled conditions because it produces errors at a higher ratio than the hard disk unit. Thus the data stored in the magneto-optical disk is provided with redundant bits for error correction codes and other functions for detecting and correcting errors.

However, while the error correction is effective with respect to random errors, it is not so effective with respect to burst errors. It may be better to treat data including errors as defective rather than correcting the errors where computer data is concerned. On the other hand, it is sufficient to correct errors in data forms like PCM audio data to such a degree that the errors cannot be audible. Errors in such data which cannot be corrected can be interpolated by the use of adjacent data having a correlation with erroneous data so that the errors will not be conspicuous.

Even so, if data is recorded in the same order as the original data and a burst error occurs in a portion of that data, then that data portion can no longer be interpolated.

OBJECTS AND SUMMARY OF THE INVENTION

Accordingly, it is the object of the present invention to provide an apparatus which appropriately records data having different characteristics.

According to an aspect of the present invention, there is provided an apparatus for recording input data on a recording medium, comprising:

a memory for storing input data to be recorded in predetermined quantity units;

a first address control means for determining an address of said memory;

a second address control means for determining an address of said memory; and an encoding means for adding at least an error correcting code to each predetermined quantity unit of input data, and wherein when the input data has no correlation with adjacent input data, the input data is sequentially written in said memory by said first address control means, read out therefrom, encoded by said encoding means, and recorded on the recording medium without changing the order of the input data, and when the input data has a correlation with adjacent input data, the input data is written in said memory by said second address control means, read out therefrom, scrambled, and then the scrambled data is encoded by said encoding means and recorded on the recording medium.

According to another aspect of the present invention, there is provided an apparatus for reproducing data from a recording medium, the data being of the type in which when the data has no correlation with adjacent data, it is encoded and recorded in the inputted order thereof on the recording medium while when the data has a correlation with adjacent data, it is scrambled, encoded and recorded on the recording medium, said apparatus comprising:

a memory for storing reproduced data in predetermined quantity units;

a first address control means for determining an address of said memory;

a second address control means for determining an address of said memory; and a decoding means for correcting possible errors in the data for each predetermined quantity unit, wherein when the data has no correlation with adjacent data, the reproduced data is sequentially written in said memory at its corresponding address by said first address control means, read out therefrom, and outputted without changing the order of the reproduced data, and when the data has a correlation with adjacent data, the reproduced data is written in said memory by said second address control means, read out therefrom, descrambled, and outputted.

The above and other objects, features, and advantages of the present invention will become apparent from the following detailed description of the preferred embodiment taken in conjunction with the accompanying drawings, throughout which like reference numerals designate like elements and parts.

DESCRIPTION OF THE PREFERRED EMBODIMENT

An embodiment of an apparatus for recording and reproducing data according to the invention will hereinafter be described, wherein a magneto-optical disk is used as an example of a recording medium.

Figure 4:
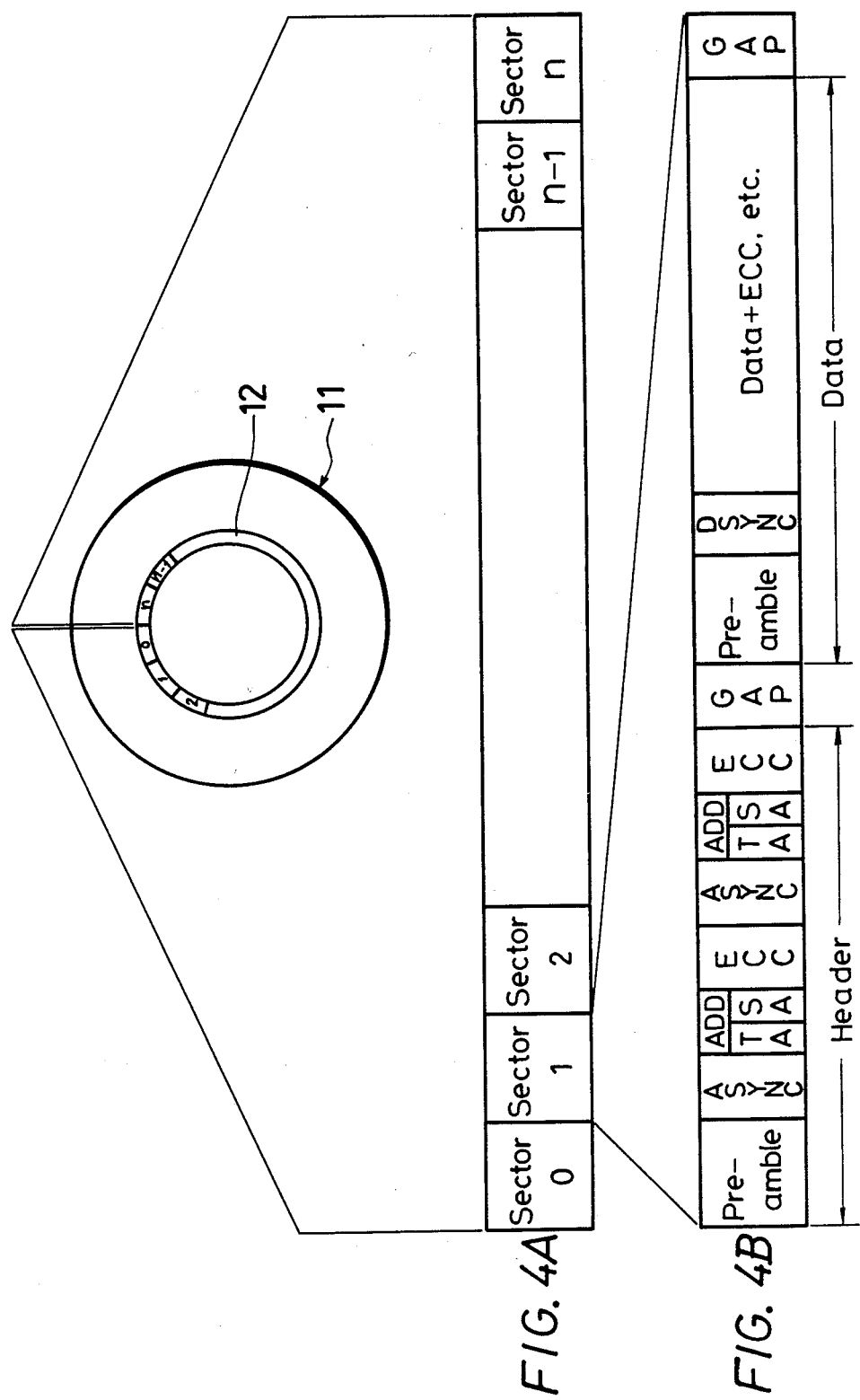
FIGS. 4A and 4B are diagrams showing an example of a sector format of a magneto-optical disk.

On a magneto-optical disk 11, as shown in FIG. 4, there are concentric or spiral tracks 12 formed such that one track is traced for each rotation of the disk 11. Data is recorded on and reproduced from each track 12. Each of the tracks 12 on the disk 11 is formed of a plurality of sectors 0, 1, 2, ... n−1, n equally divided in the direction of its circumference. On each sector, there is recorded a predetermined amount of data and redundant bits, such as an error correcting code and an error detecting code, which are added to the predetermined amount of data.

As shown in FIG. 4A, one track is formed of (n+1) sectors, and in this example, is determined as 31, that is, one track is formed of 32 sectors.

A format for data recorded in one sector is constructed, for example, as shown in FIG. 4B. To be specific, one sector is comprised of a header portion, a data portion, and gap portions GAP which are placed behind each of the header and data portions.

In the header portion, there is recorded a preamble signal at its head and following thereto there is twice recorded the grouping of: an address synchronizing signal ASYNC for synchronizing the address data, an address signal ADD, comprising track address data TA and sector address data SA, and an error correcting code ECC for correcting possible errors in the address signal.

Further, in the data portion, there are recorded a preamble signal at its head and following thereto, a data synchronizing signal DSYNC and data to be recorded on the magneto-optical disk with an error correcting code (ECC) for correcting possible errors in the data.

Figure 5:
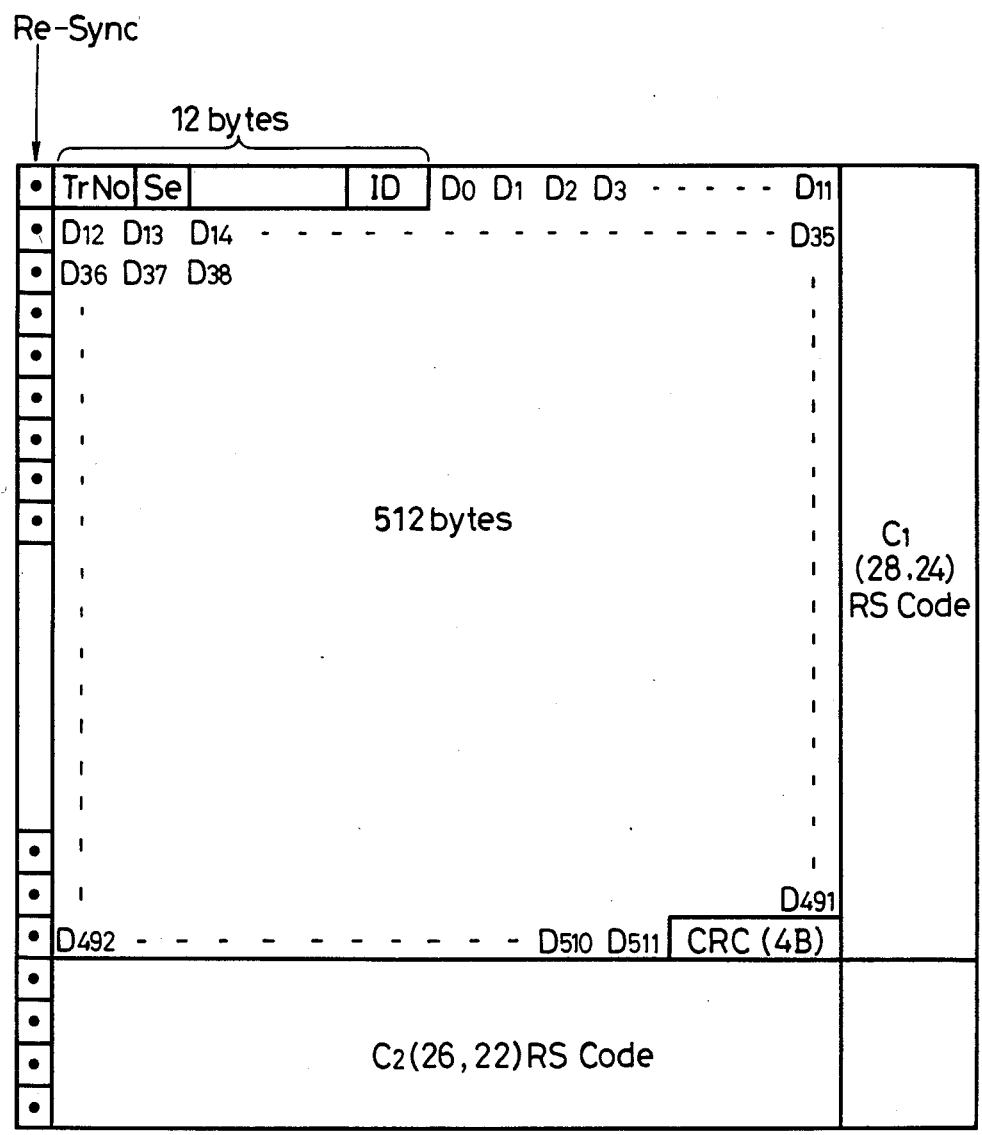
FIG. 5 is a diagram showing a construction of the data portion arranged in one sector.

The unit quantity of data to be recorded in the data portion of each sector is generally 512 bytes, considering that the disk is used as a storage medium for a computer. FIG. 5 shows the construction of the data portion for the above-mentioned case.

Referring to FIG. 5, the data recorded in each sector is 512 bytes, i.e., $D_0$–$D_{511}$. Preceding the 512 bytes of data there are additionally recorded 12-bytes of supplementary data comprising a track number TrNo, a sector number SeNo, a user area and data identification information ID. Then, a 4-byte CRC code for detecting errors is produced and added at the end of the preceding 524-bytes of data. The 528-bytes of data thus formed is arranged in a matrix having 24 byte rows and 22 byte columns, as shown in FIG. 5.

Then, a first error correcting code $C_1$ having 4 bytes (e.g., (28, 24) Reed-Solomon code) is added to each row of the 528-bytes of data including the 4-byte CRC code. In the same manner, a second error correcting code $C_2$ having 4 bytes (e.g., (26, 22) Reed-Solomon code) is added to each column of the 528-bytes of data.

Referring again to FIG. 5, there is recorded at the head of each row a synchronizing signal (hereinafter simply called "Re-SYNC") indicative of the head of each row, by which the data is sequentially recorded and read along the row direction.

Reference is now made to an example of the invention which records a variety of information on a disk defined by the above-mentioned sector format as well as a reproducing apparatus associated therewith.

Figure 1:
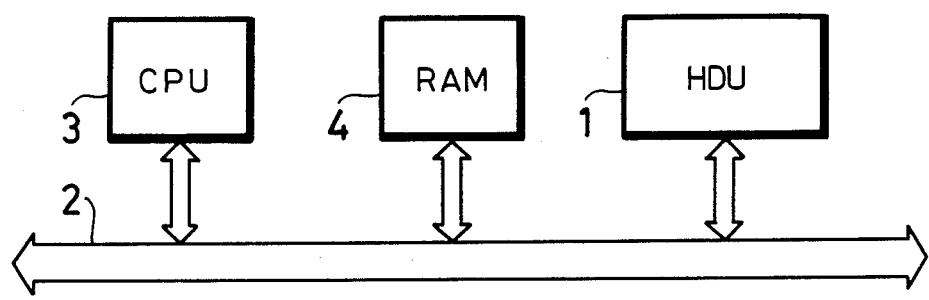
FIG. 1 is a block diagram schematically showing a prior art data recording and reproducing system.
Figure 2:
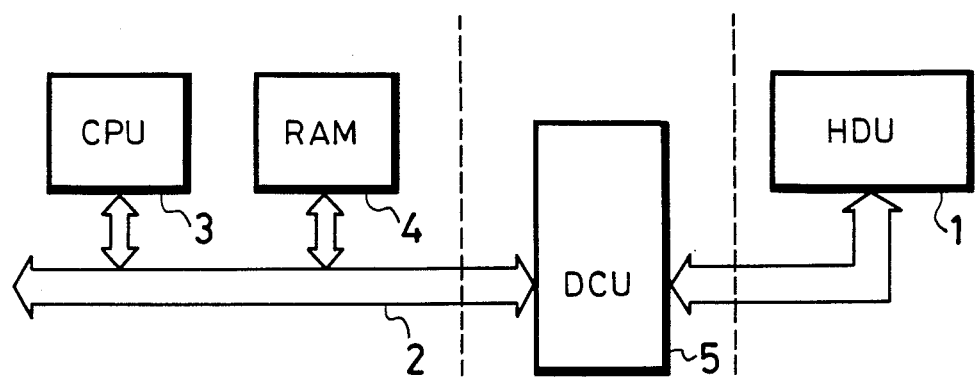
FIG. 2 is a block diagram schematically showing another prior art data recording and reproducing system.
Figure 3:
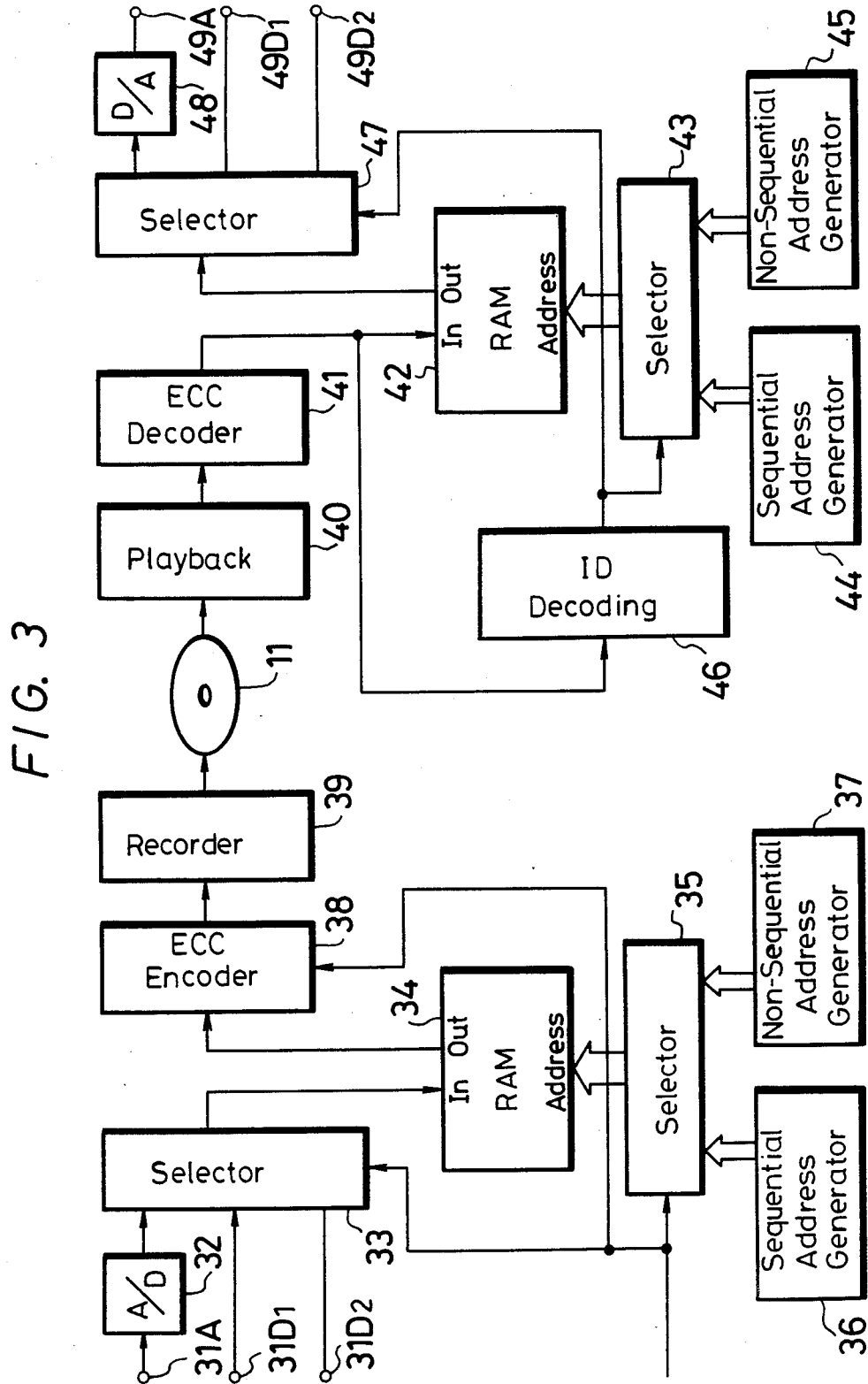
FIG. 3 is a block diagram schematically showing, by way of example, a whole arrangement of a recording and reproducing apparatus according to the present invention.

Referring now to the block diagram of FIG. 3, reference numeral 11 designates a magneto-optical recording disc including, e.g., a spiral-shaped track on which the above data is recorded. A recording and reproducing head (not shown) in the apparatus is controlled such that the head correctly scans the previously formed track.

Reference numeral $31D_1$ designates a first digital data input terminal to which is inputted digital data such as data from a computer, in which adjacent data have no correlation with each other. Reference numeral $31D_2$ designates a second digital data input terminal to which is inputted time sampled analog data, for example, analog audio data sampled at various predetermined sampling frequencies with each value being sampled as one word made of a predetermined number of bits, digital data at various transmission rates of data, and so on. Such digital data has a correlation between adjacent data and can be interpolated with the adjacent data. Reference numeral 31A designates an input terminal to which are supplied analog signals, e.g., audio signals.

Digital data inputted to the terminals $31D_1$ and $31D_2$ are supplied to a selector 33 while analog signals inputted to the terminal 31A are first supplied to an A/D converter 32 to be converted into corresponding digital signals. The sampling frequency of the A/D converter 32 can be changed to various values, e.g., 32 kHz, 44.1 kHz, 48 kHz, and so on. Further, it is possible that the sample can be selected from various numbers of bits, e.g., 8-bits, 12-bits, 16-bits and so on. In the case of such digitally converted analog signals, particularly in the case of digitally converted audio signals, the resulting signal has a correlation among data words so that an erroneous word can be interpolated by words located at the vicinity of said erroneous word. This is because the changes in amplitude of an analog signal are not as likely to be abrupt as in the case of a digitally generated signal. The digital signal from the A/D converter 32 is supplied to the selector 33.

The selector 33 selects, by manual operation or a control signal SS supplied thereto from an external circuit (not shown), one of the signals from the input terminals $31D_1$, $31D_2$ or the output of the A/D convertor 32. The digital signal selected by the selector 33 is stored in a RAM 34. In this case, the write and read addresses in the RAM 34 can be changed in accordance with the input data selected by the selector 33.

To be specific, reference numeral 36 designates a sequential address control means which generates a sequential address for the writing and reading addresses, and reference numeral 37 designates a scrambled address control means which generates writing and reading addresses which follow a predetermined order for the cases where one of the two reading and writing of addresses is sequential and the other of the two addresses is scrambled. One of the addresses generated by the address control means 36 and 37 is selected by a selector 35 to be supplied to address terminals of the RAM 34. The selector 35 is controlled by a selection signal SS in ganged relation with the selector 33.

When the digital data from the input terminal $31D_1$ is to be selected by the selector 33, the address generated by the sequential address control means 36 and selected by the selector 35 is supplied to the RAM 34 in which each of the 512-bytes of data is sequentially written at an address corresponding thereto, i.e., $D_0$, $D_1$, $D_2$, . . . as shown in FIG. 5.

The RAM 34 generally comprises two chips of RAM devices. Data is written into a vacant one of them and read out from one into which data has been fully written. In the read-out procedure, data is sequentially read from the RAM 34 in the same order as the writing by the sequential address, and supplied to an ECC encoder 38 wherein the additional information and redundant data $C_1$ and $C_2$ are added thereto as shown in FIG. 5 to thereby form the data portion for each sector. The data portion thus formed is supplied to a recording process circuit 39 wherein the header portion is added thereto, as shown in FIG. 4, adequately modulated, and recorded on the magneto-optical disk 11 as one sector.

When the data from the A/D converter 32 or the data from the input terminal $31D_2$ is to be selected by the selector 33, the selector 35 supplies the RAM 34 with the address generated by the scrambled address control means 37. If it is assumed at this time that the audio data concerned is an 8-bit 2-channel stereo, first samples $L_0$, $R_0$ of the left and right channels are respectively written at the first and second byte positions $D_0$, $D_1$ of the 512-bytes of data shown in FIG. 5, and the next samples $L_1$, $R_1$ respectively written at the 257th and 258th byte positions $D_{257}$, $D_{258}$, that is, the first and second byte positions of the latter half of the 512-bytes of data. Then, following in the same manner, samples of even number channels are written in the former half of the 512 bytes of data, and samples of odd number channels in the latter half of the 512-bytes of data, that is, data is written in a scrambled manner.

Figure 6:
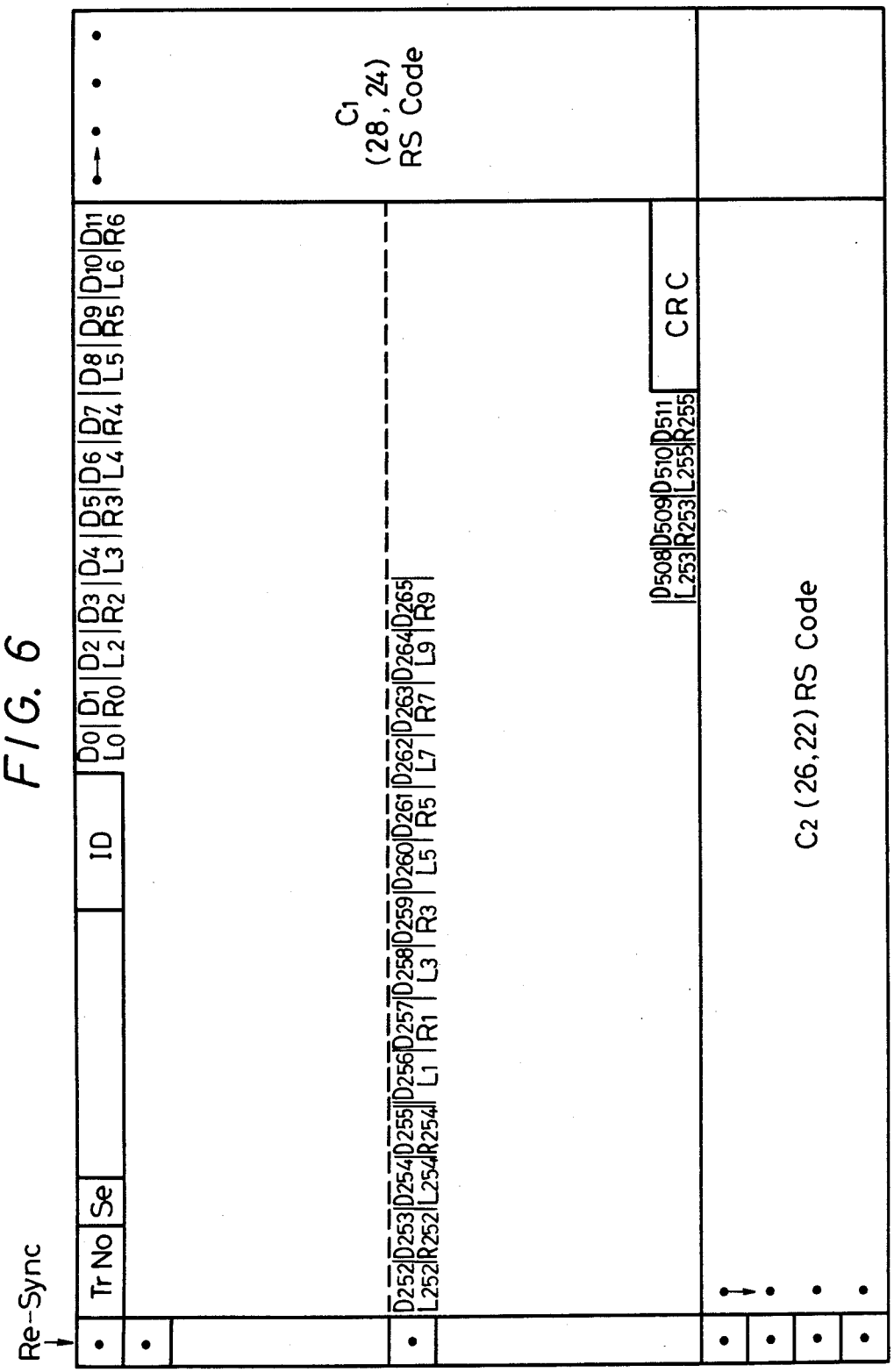
FIG. 6 is a diagram showing a construction of the data portion when data is scrambled.

The data thus scrambled is sequentially read out along the row direction, i.e., $D_0$, $D_1$, $D_2$, . . . , following the reading address signals generated by the control means 37. In other words, data is read out in a scrambled state and supplied to the ECC encoder 38 wherein the additional information and redundant data $C_1$ and $C_2$ as shown in FIG. 6 are added thereto. The data portion thus formed is supplied to the recording process circuit 39 wherein the header portion is added thereto, as shown in FIG. 4, adequately modulated, and recorded as one sector on the magneto-optical disk 11.

The selection signal SS is supplied to the ECC encoder 38 causing an identification signal, which indicates whether the data to be recorded is scrambled or not, to be recorded in an ID portion of the supplementary information portion. This identification signal may be recorded in the header portion. Further, the identification signal may be recorded in a track directory allocated at the most inner or the most outer track of the disk 11 in which information relative to data to be recorded on the disk is recorded.

The RAM 34 is shown as distinguished from a RAM arranged in the encoder 38 for a better understanding of the operation of the apparatus of the invention, however, in a practical device, these RAMs are replaced by one RAM system which can serve for the both purposes. To be specific, the redundant data $C_1$ and $C_2$ are produced for the data in the one RAM by the ECC encoder 38 and written in the RAM, and then the written data with the redundant data is read out from the RAM and supplied to the recording process circuit 39.

If the rotational speed of the disk 11 is determined as 1406 ¼ rpm, the data transmission rate is 3.072 Mbps (1.536 Mbps×2). If data, the sampling frequency of which is 8 kHz and the word length of which is 8 bits, is recorded on the disk it is possible to record 48 channels on a disk. In the case of an audio signal having a sampling frequency of 32 kHz and a word length of 8 bits, it is possible to record 12 channels. It is also possible to record 4 channels of an audio signal having a sampling frequency of 48 kHz and a word length of 16 bits.

If the rotational speed of the disk is changed, data having a different transmission rate can be recorded in each sector as a 512-byte data block.

The data recorded as described above is reproduced in the following manner.

The data reproduced from the disk 11 by the head (not shown) is demodulated by a reproducing process circuit 40, supplied to an ECC decoder 41 wherein possible errors are corrected, and the 512-byte data portion is stored in a RAM 42.

In the reproducing system, it is required to switch the address of the RAM 42, corresponding to whether or not the recorded data is scrambled. Reference numeral 44 designates a sequential address control means corresponding to the sequential address control means 36 in the recording system, and reference numeral 45 designates a descrambled address control means corresponding to the scramble address control means 37 in the recording system.

One of the output addresses from the address control means 44 and 45 is selected by a selector 43 according to the recorded data and supplied to the RAM 42.

The output from the ECC decoder 41 is supplied to an identification signal decoding circuit 46 wherein it is determined from the identification signal stored in the ID portion of the supplementary information portion whether or not the data is scrambled. If the recorded data is not scrambled, the selector 43 selects the address from the sequential address control means 44 which is then supplied to the RAM 42, whereby the data is written in and read out from the RAM 42 in the order of the address. The read-out data is supplied to a selector 47.

If the recorded data is scrambled, the selector 43 selects the address from the descrambled address control means 45 which is then supplied to the RAM 42, wherein the scrambled data from the ECC decoder 41 is descrambled so as to be sequentially stored in the RAM 42 in the original order. Since the data is rearranged in the original order, the data is sequentially read from the RAM 42 in accordance with the sequential address. The read-out data is then supplied to the selector 47.

The selector 47 outputs data, under control of a selection signal generated from the identification signal decoding circuit 46 and in accordance with the recorded data, to one of two digital data output terminals 49D$_1$, 49D$_2$ or a D/A converter 48 whose output signal is delivered to an output terminal 49A. The signals output from the terminals 49D$_1$ and 49D$_2$ correspond to the type of data input to terminals 31D$_1$ and 31D$_2$, respectively.

As described above, when the data is scrambled and then recorded, even if a burst error occurs during a reproducing procedure and cannot be corrected by the ECC decoder, assuming that all of the data in the former half of one sector is erroneous, there are still left the odd-numbered sampled data so that the even-numbered sampled data therebetween can be easily interpolated by, e.g., an average value interpolation.

If the identification signal is recorded in the header portion or in the directory, the reproduction can be made in the same way as described above.

Further, since the identification signal is recorded in a predetermined portion separate from the data, the identification signal decoding circuit 46 may be supplied with the signal inputted to the input side of the ECC decoder 41.

Also in the reproducing system, the RAM 42 and a RAM arranged in the ECC decoder 41 are generally replaced by one RAM system. To be specific, the data and redundant data written in the one RAM are first read out to correct possible errors in the ECC decoder 41, and the corrected data is written in the RAM. Then, the corrected data written in the RAM is read out.

Further, the RAM 34 in the recording system and the RAM 42 in the reproducing system may be commonly used.

Although in the above embodiment the magneto-optical disk is given as an example, the present invention is not limited thereto.

As described above, according to the present invention, the data is recorded on the disk in accordance with the characteristics of the data to be recorded, so that data having a correlation with adjacent data can be easily interpolated.

Further, for recording data which have no correlation with adjacent data, it is possible to facilitate the address control in the memory and thereby simplify the software therefor.

The above description is given on a single preferred embodiment of the invention but it will be apparent that many modifications and variations could be effected by one skilled in the art without departing from the spirit or scope of the novel concepts of the invention so that the scope of the invention should be determined by the appended claims only.

We claim as our invention:

1. Apparatus for recording input data on a recording medium, comprising:
   a memory for storing input data to be recorded in units of a predetermined quantity;
   a first address control means for determining an address of said memory;
   a second address control means for determining an address of said memory; and
   an encoding means for adding at least an error correcting code to each predetermined quantity unit of input data, and
   wherein when the input data has no correlation with adjacent input data, the input data is sequentially written in said memory by said first address control means, read out therefrom, encoded by said encoding means, and recorded on the recording medium without changing the order of the input data, and when the input data has a correlation with adjacent input data, the input data is written in scrambled form in said memory by said second address control means, read out therefrom, as scrambled, and then the scrambled data is encoded by said encoding means and recorded on the recording medium.

2. Apparatus according to claim 1, in which said first address control means generates sequential addresses when the data is written in and read out from said memory, and said second address control means generates non-sequential addresses when the data is written in said memory or read out from said memory.

3. Apparatus according to claim 1 further comprising a selector for selectively supplying said memory with the address generated by either said first address control means or said second address control means corresponding to whether or not the input data has a correlation with adjacent data.

4. Apparatus according to claim 1 further comprising an identification signal recording means which records on said recording medium an identification signal which indicates whether or not the input data has a correlation with adjacent data.

5. Apparatus according to claim 1, in which the data which has no correlation with adjacent data is data for a computer.

6. Apparatus according to claim 1, in which the data which has a correlation with adjacent data is data converted from an analog signal into a PCM signal.

7. Apparatus according to claim 1, in which said encoder means comprises a product code producing means.

8. Apparatus for reproducing data from a recording medium, the data being of the type in which it is encoded and recorded in the inputted order thereof on the recording medium while when the data has a correlation with adjacent data, it is scrambled, encoded and recorded on the recording medium, said apparatus comprising:
   a memory for storing reproduced data in predetermined quantity units;
   a first address control means for determining an address of said memory;
   a second address control means for determining an address of said memory; and
   a decoding means connected to the first address control means, the second address control means and the memory for correcting possible errors in the data for each predetermined quantity unit, wherein when the data has no correlation with adjacent data, the reproduced data is sequentially written in said memory at its corresponding address by said first address control means, read out therefrom, and outputted without changing the order of the reproduced data, and when the data has a correlation with adjacent data, the reproduced data is written in said memory by said second address control means, read out therefrom, descrambled, and outputted.

9. Apparatus according to claim 8, in which said first address control means generates sequential addresses when the data is written into and read from said memory and said second address control means generates non-sequential addresses when the data is written into said memory or read out from said memory.

10. Apparatus according to claim 8 further comprising a selector for selectively supplying said memory with either the addresses from said first address control means or from said second address control means corresponding to whether or not the data has a correlation with adjacent data.

11. Apparatus according to claim 8 further comprising a detecting means which detects an identification signal which indicates whether or not the recorded data has a correlation with adjacent data, and generates an output signal which is used to control said selector.

* * * * *